(12) United States Patent
Otani et al.

(10) Patent No.: US 8,166,264 B2
(45) Date of Patent: Apr. 24, 2012

(54) METHOD AND APPARATUS FOR LOGICAL VOLUME MANAGEMENT

(75) Inventors: Toshio Otani, Sunnyvale, CA (US); Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 426 days.

(21) Appl. No.: 12/366,590

(22) Filed: Feb. 5, 2009

(65) Prior Publication Data
US 2010/0199053 A1  Aug. 5, 2010

(51) Int. Cl.
*G06F 12/00* (2006.01)
(52) U.S. Cl. .. 711/162; 711/170; 711/202; 711/E12.103
(58) Field of Classification Search .......................... None
See application file for complete search history.

(56) References Cited

U.S. PATENT DOCUMENTS

| 7,293,152 | B1 | 11/2007 | Srinivasan et al. | |
| 2002/0156987 | A1* | 10/2002 | Gajjar et al. | 711/203 |
| 2004/0260900 | A1* | 12/2004 | Burton et al. | 711/162 |
| 2005/0010688 | A1* | 1/2005 | Murakami et al. | 709/245 |
| 2005/0125538 | A1* | 6/2005 | Tawil | 709/226 |
| 2006/0265529 | A1 | 11/2006 | Kuik et al. | |
| 2007/0073782 | A1 | 3/2007 | Nakatani | |
| 2009/0157984 | A1* | 6/2009 | Hara et al. | 711/154 |

OTHER PUBLICATIONS

European Office Action dated Oct. 4, 2010, Issued in Corresponding European Patent Application 09252089.9-2413.
R. Dekoning, "World Wide Names Usage for Volumes (Logical Units) Tutorial", X3T10/97-126R0, created and updated on Jan. 1997.

* cited by examiner

*Primary Examiner* — Reginald Bragdon
*Assistant Examiner* — Aracelis Ruiz
(74) *Attorney, Agent, or Firm* — Sughrue Mion, PLLC

(57) ABSTRACT

Systems and methods for consistent logical volume management of the storage subsystem. The present invention guarantees permanent identification data consistency while migrating, mirroring, creating, deleting LU and so on. It prevents the administrator from the change of management.

17 Claims, 24 Drawing Sheets

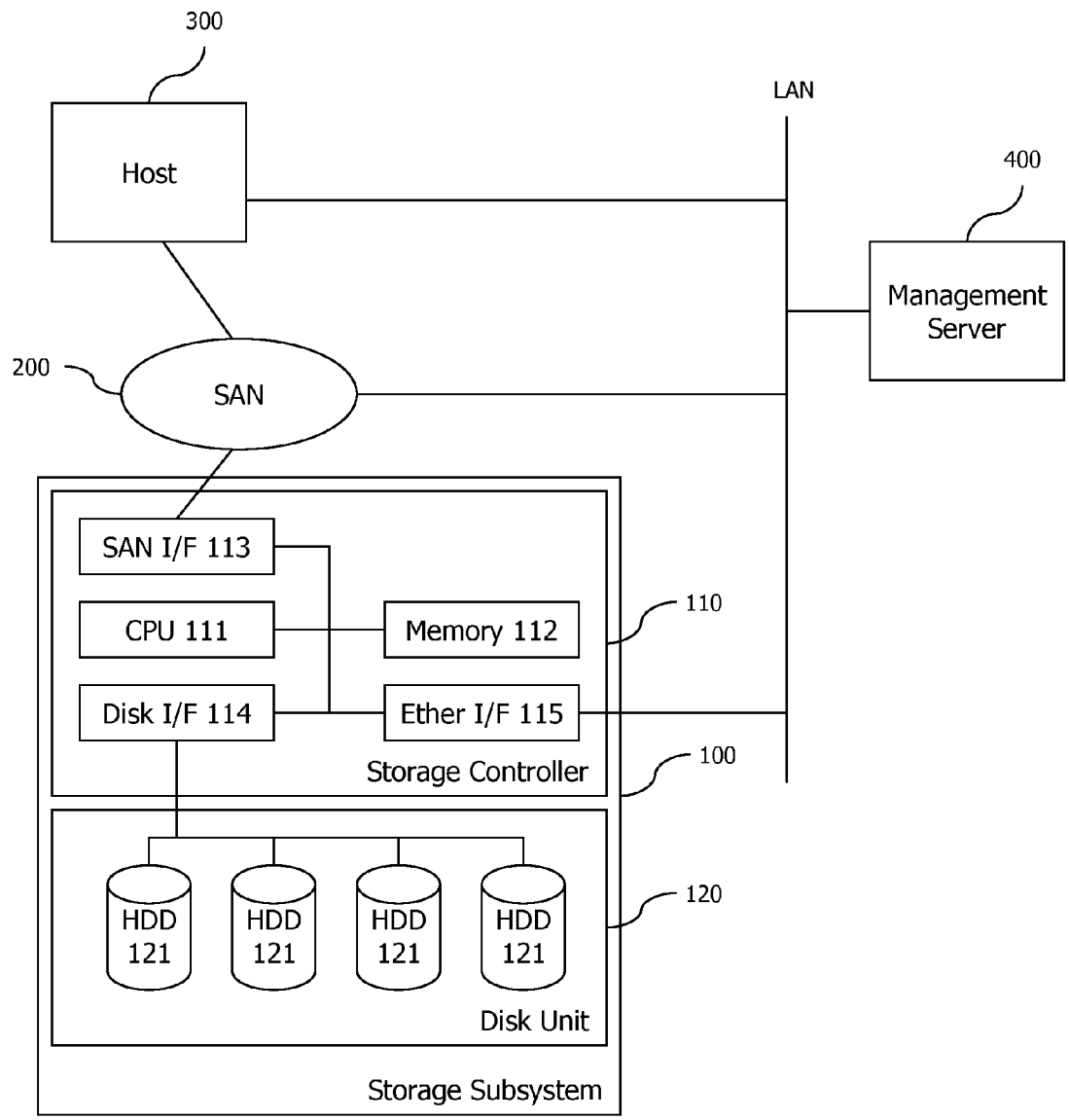
Fig.1 System Configuration

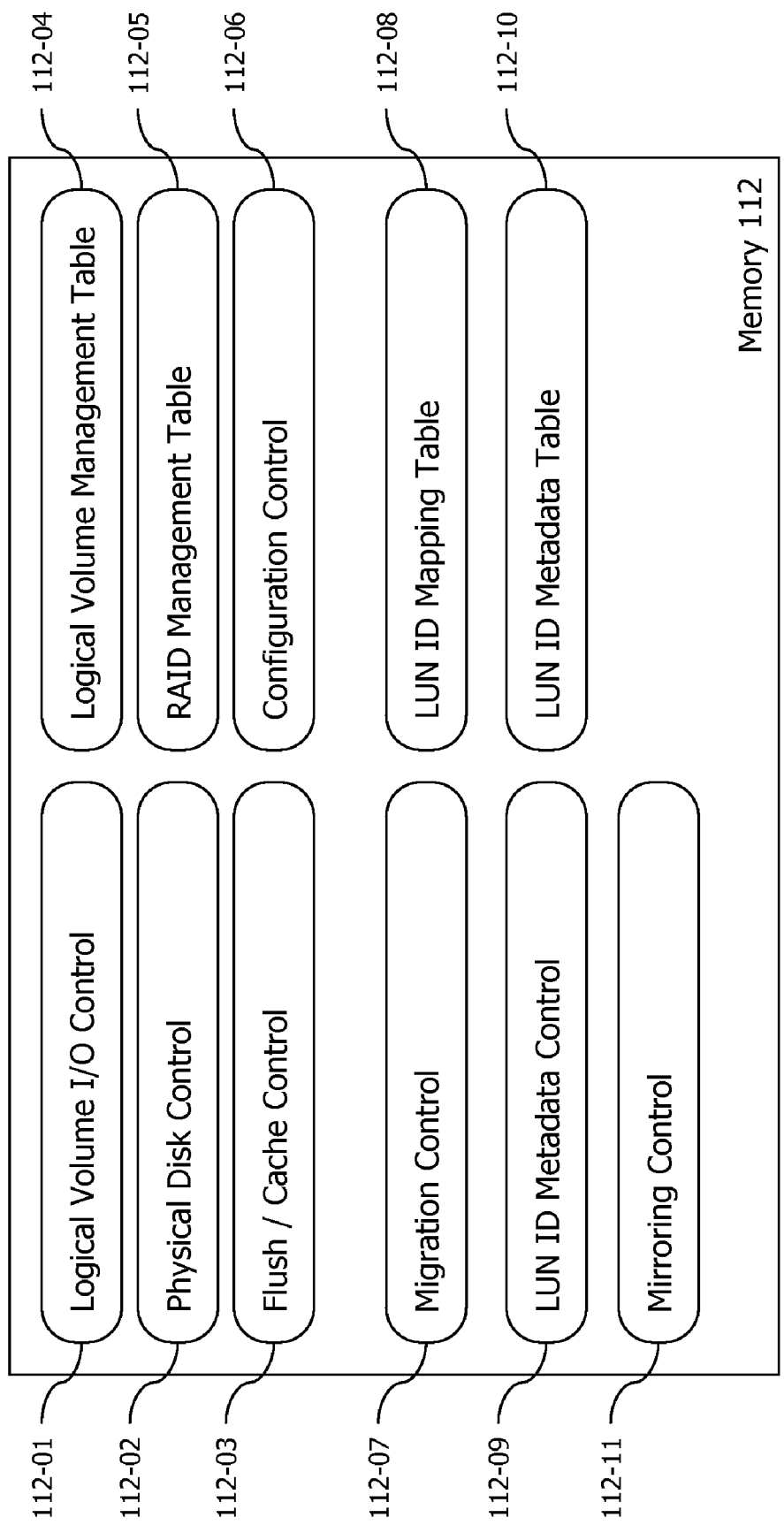
Fig.2 Software Module Configuration on Storage Controller

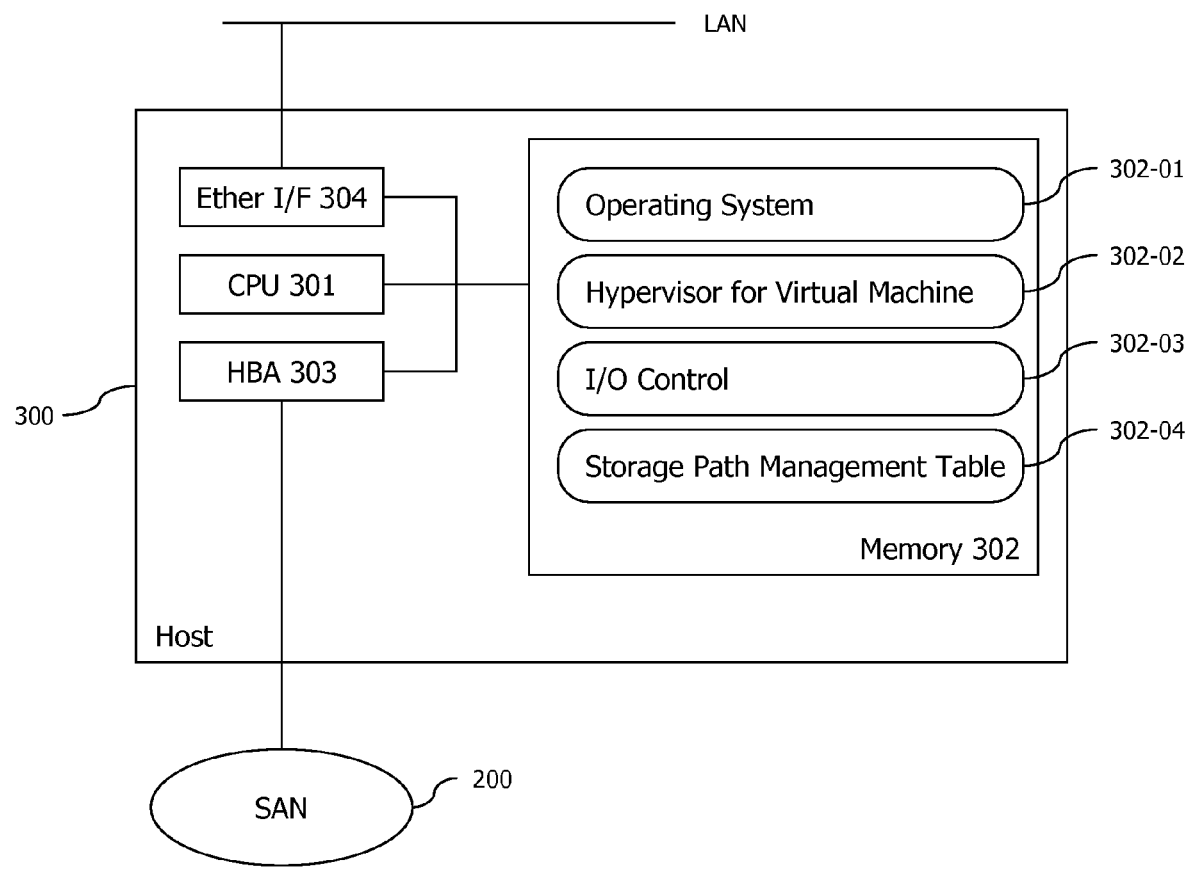
Fig.3 Configuration of Host

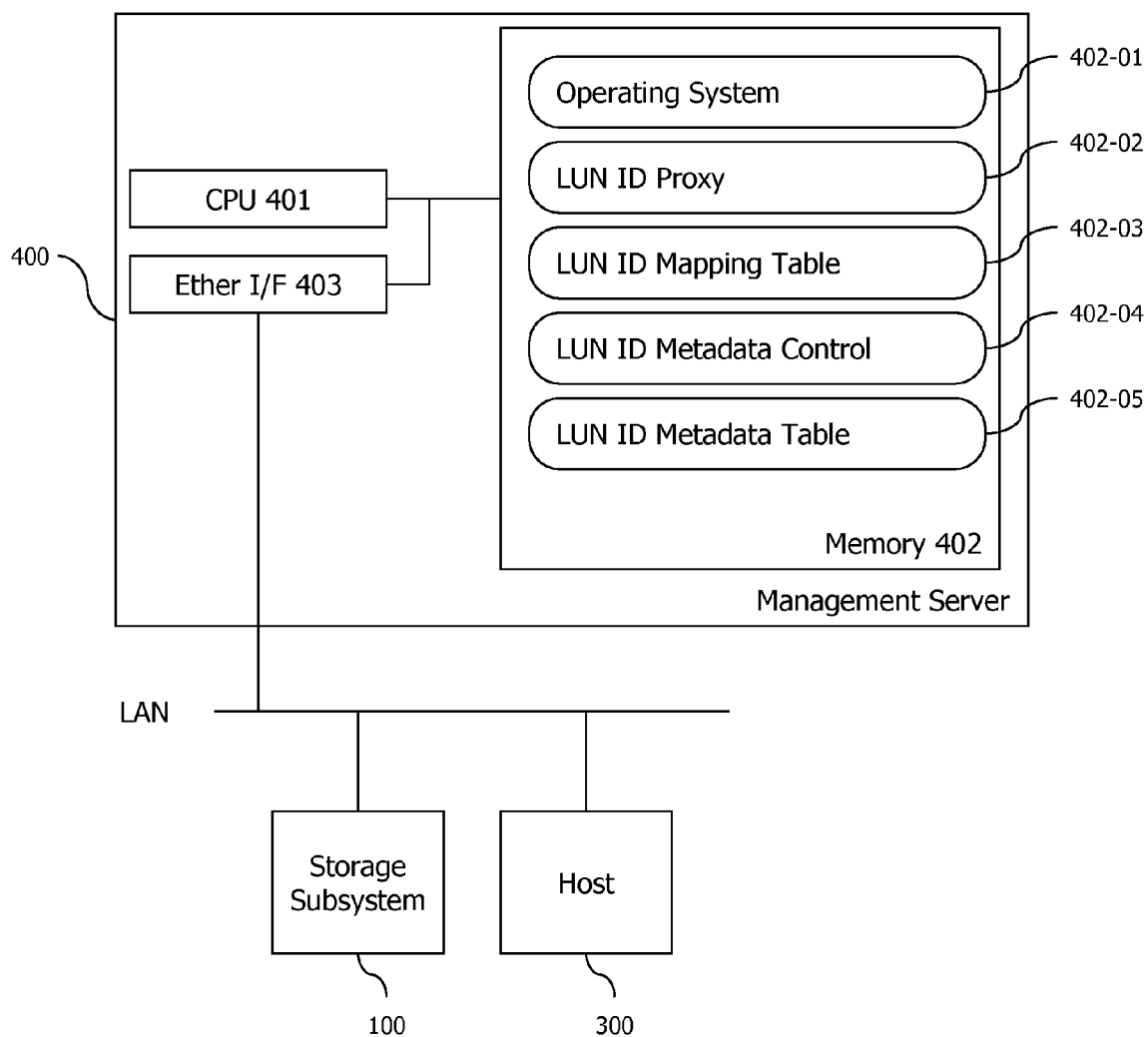
Fig.4 Configuration of Management Server

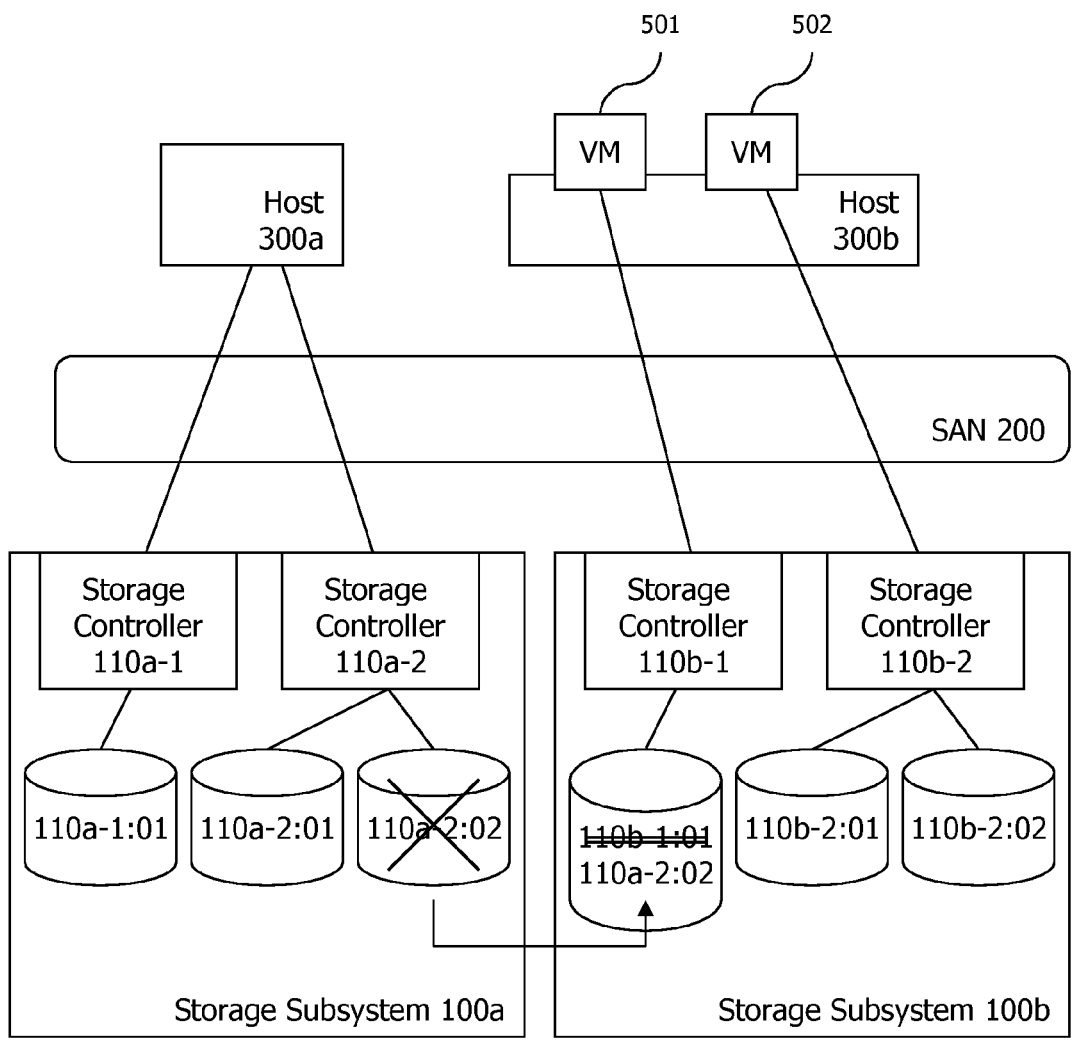
Fig.5 System Configuration (logical view)

| LUN | VOL # | LUN ID |
|---|---|---|
| 0 | 0 | 110a-1:01 |
| 0 | 1 | 110a-2:01 |
| 1 | 2 | 110a-2:02 |

Logical Volume Management Table 112a-04

Fig.6 Example of Logical Volume Management Table

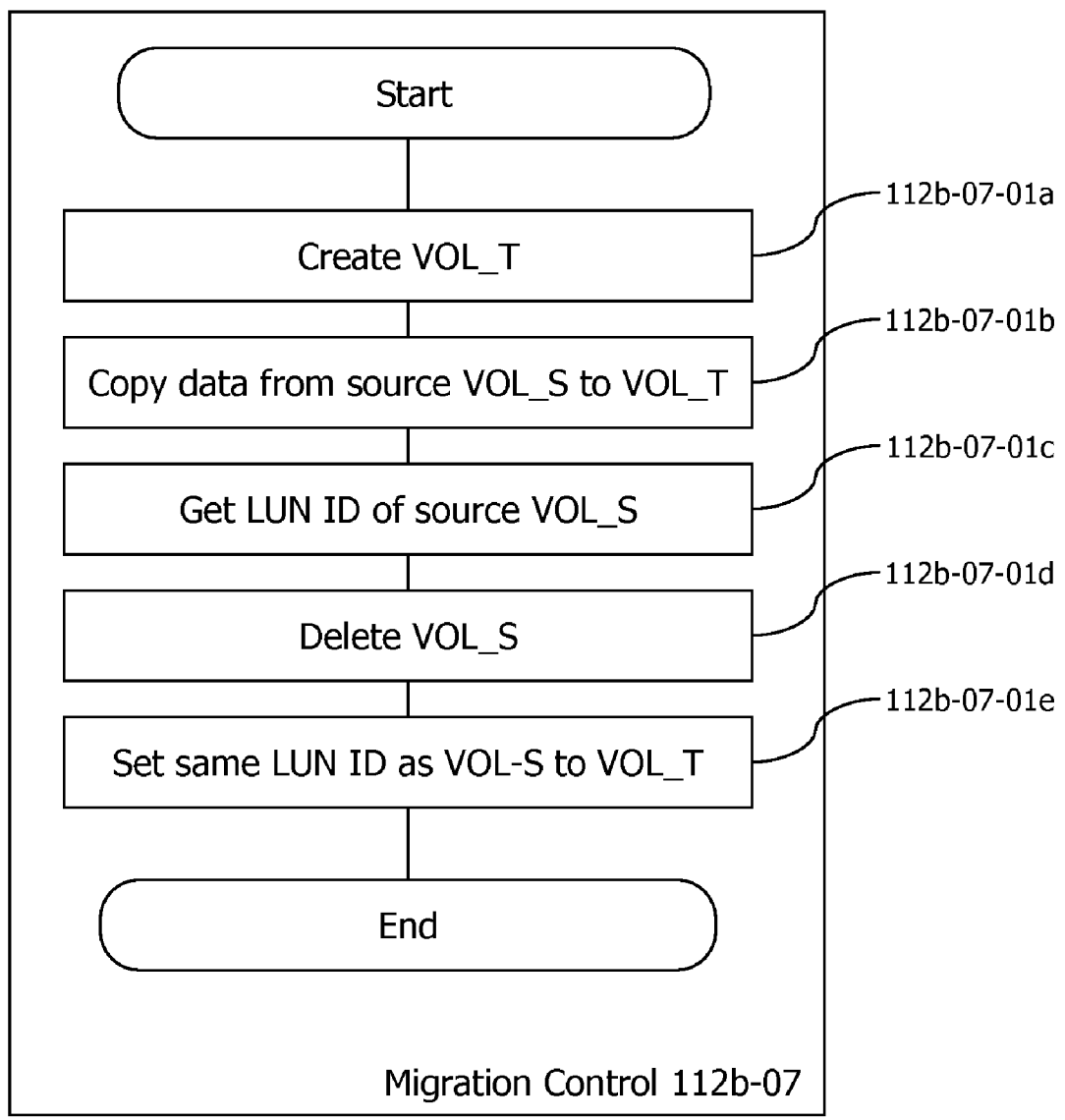
Fig.7 Flowchart of VOL migration with LUN ID

| LUN | VOL # | LUN ID |
|---|---|---|
| 0 | 0 | 110a-1:01 |
| 0 | 1 | 110a-2:01 |
| ~~1~~ | ~~2~~ | ~~110a-2:02~~ |

Logical Volume Management Table 112a-04

Fig.8a Example of Logical Volume Management Table

| LUN | VOL # | LUN ID |
|---|---|---|
| 0 | 0 | 110a-2:02 |
| 0 | 1 | 110b-2:01 |
| 1 | 2 | 110b-2:02 |

Logical Volume Management Table 112b-04

Fig.8b Example of Logical Volume Management Table

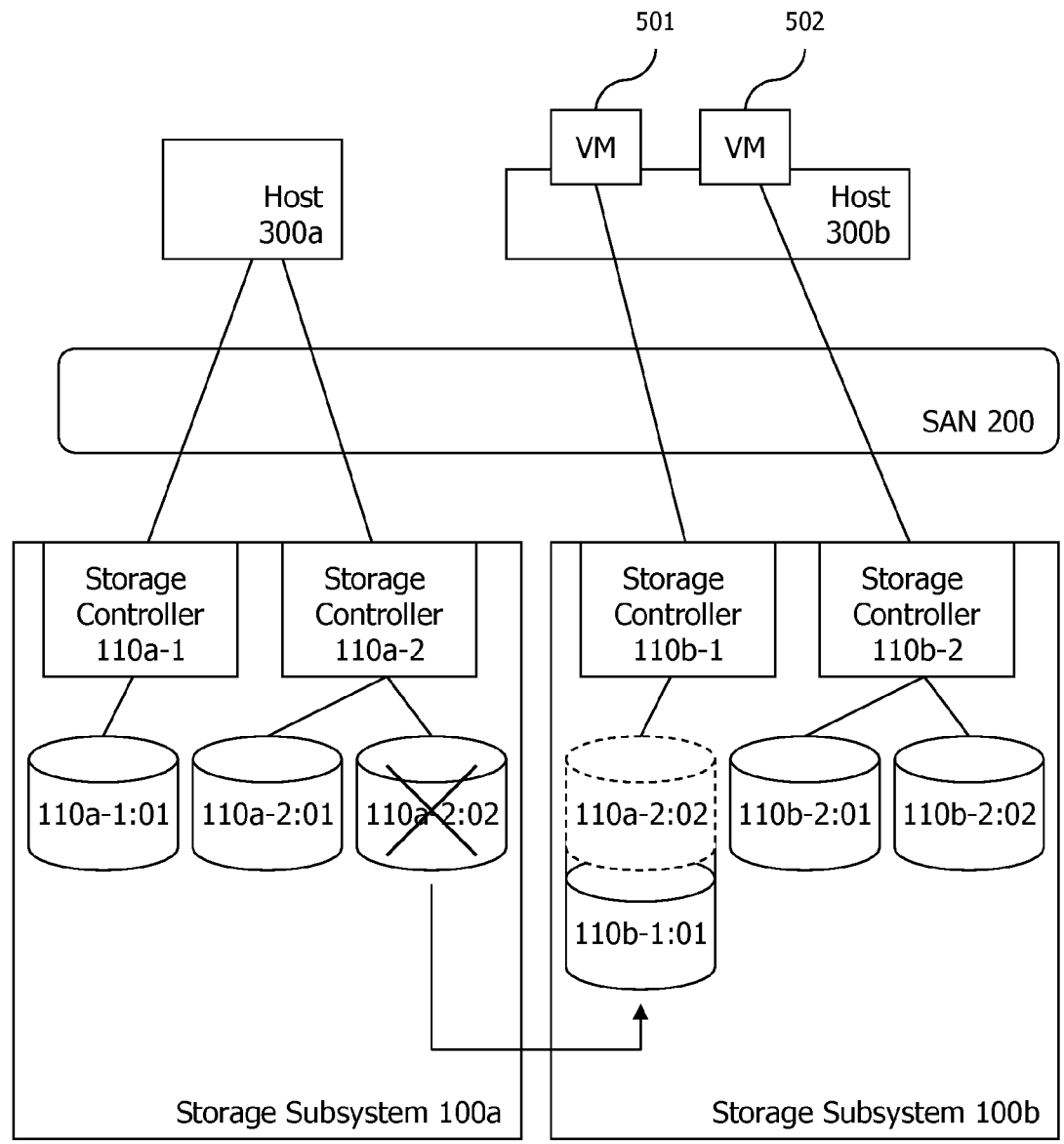
Fig.9 System Configuration (logical view)

| LUN ID (virtual) | LUN ID (physical) |
|---|---|
| 110a-2:02 | 110b-1:01 |
| - | 110b-2:01 |
| - | 110b-2:02 |

LUN ID Mapping Table 112b-08

Fig.10 Example of LUN ID Mapping Table

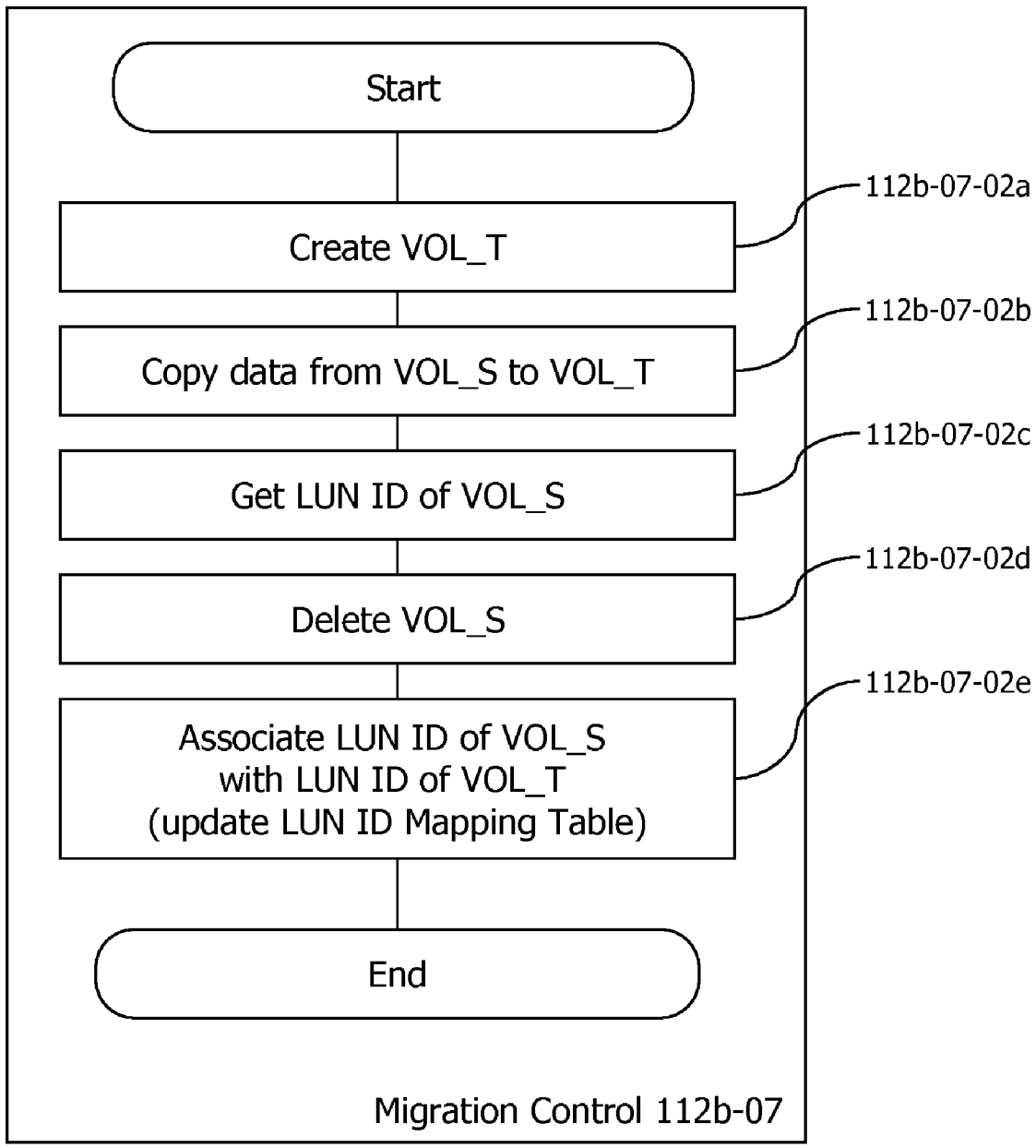
Fig.11 Flowchart of VOL migration with LUN ID (updates mapping table)

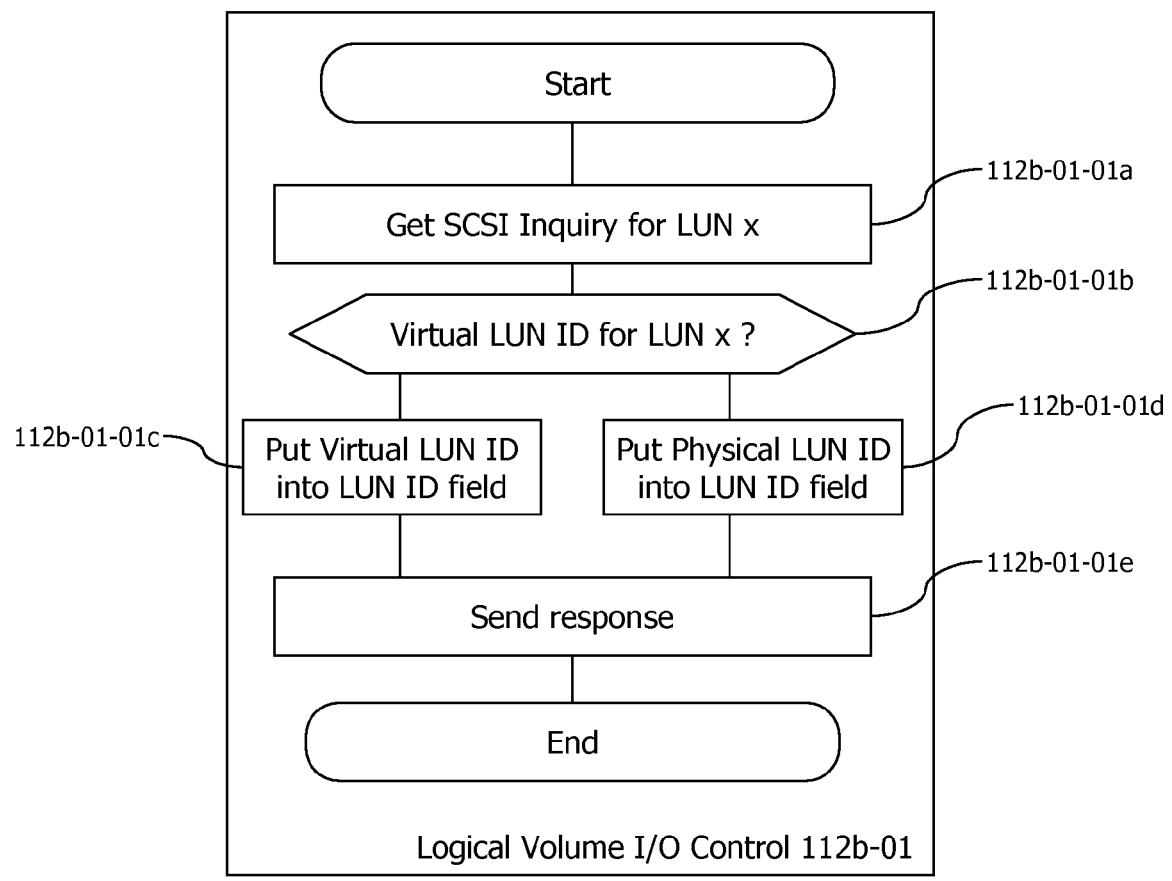
Fig.12 Flowchart of Logical Volume I/O Control
(SCSI Inquiry response)

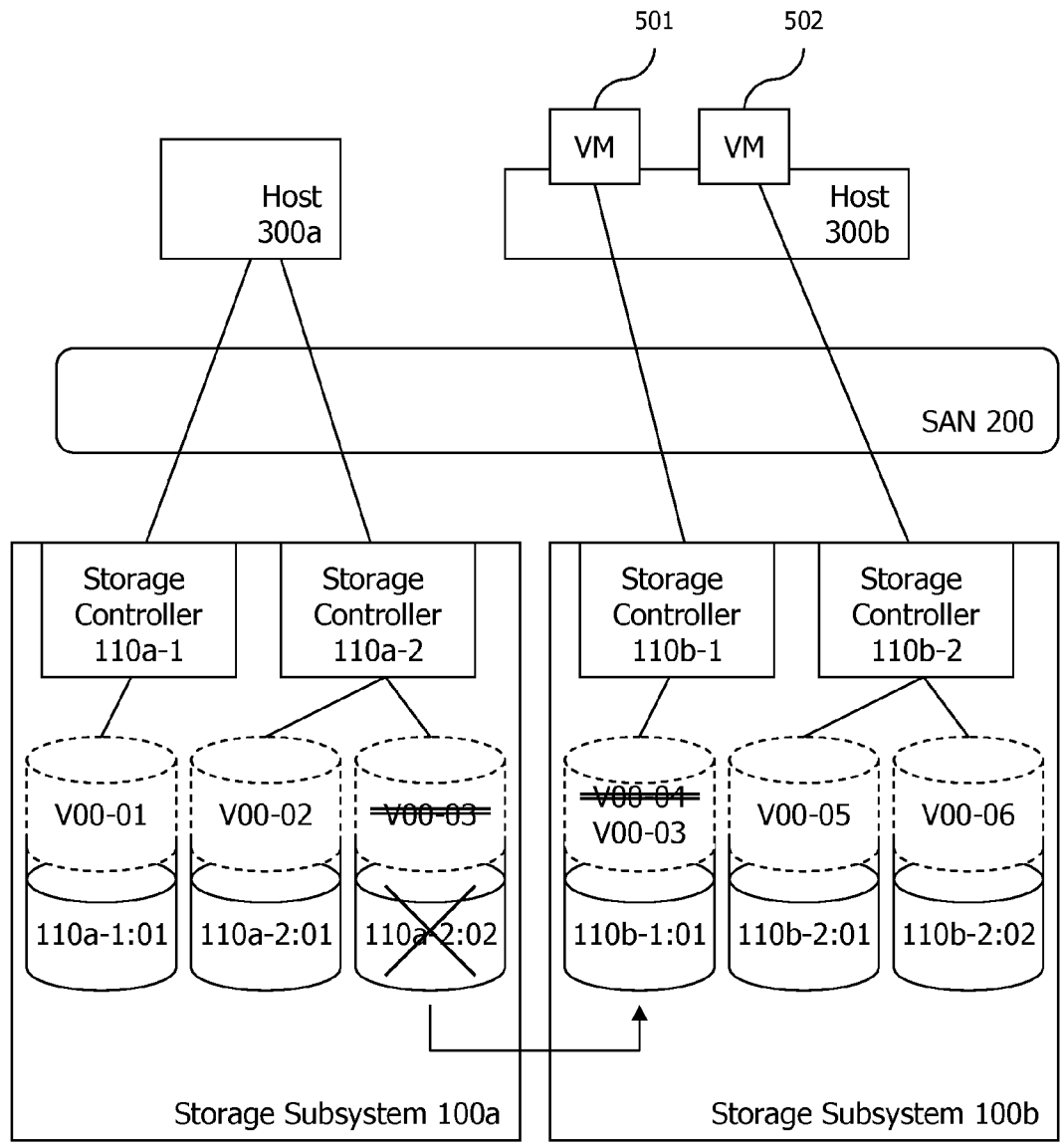
Fig.13 System Configuration (logical view)

| LUN ID (virtual) | LUN ID (physical) |
|---|---|
| V00-01 | 110a-1:01 |
| V00-02 | 110a-2:01 |
| V00-03 | 110a-2:02 |

LUN ID Mapping Table 112a-08

Fig.14a Example of LUN ID Mapping Table

| LUN ID (virtual) | LUN ID (physical) |
|---|---|
| V00-04 | 110b-1:01 |
| V00-05 | 110b-2:01 |
| V00-06 | 110a-2:02 |

LUN ID Mapping Table 112b-08

Fig.14b Example of Logical Volume Management Table

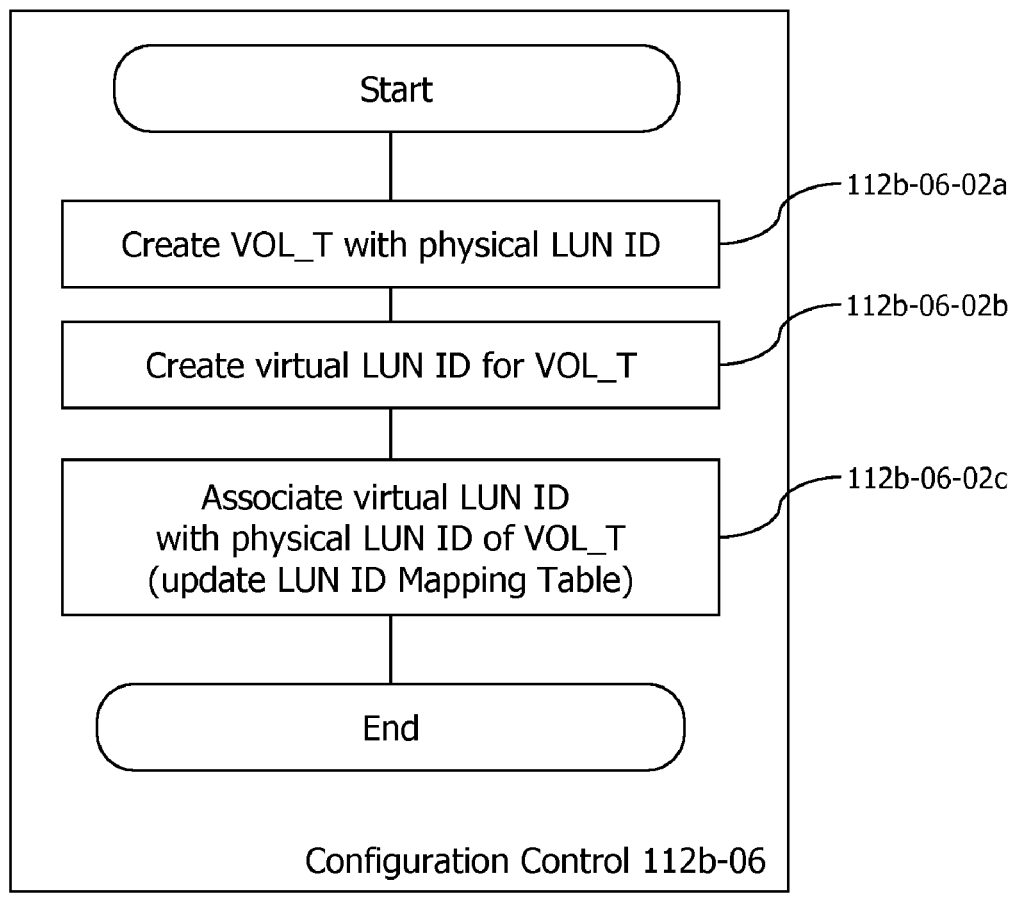
Fig.15 Flowchart of VOL creation with virtual LUN ID

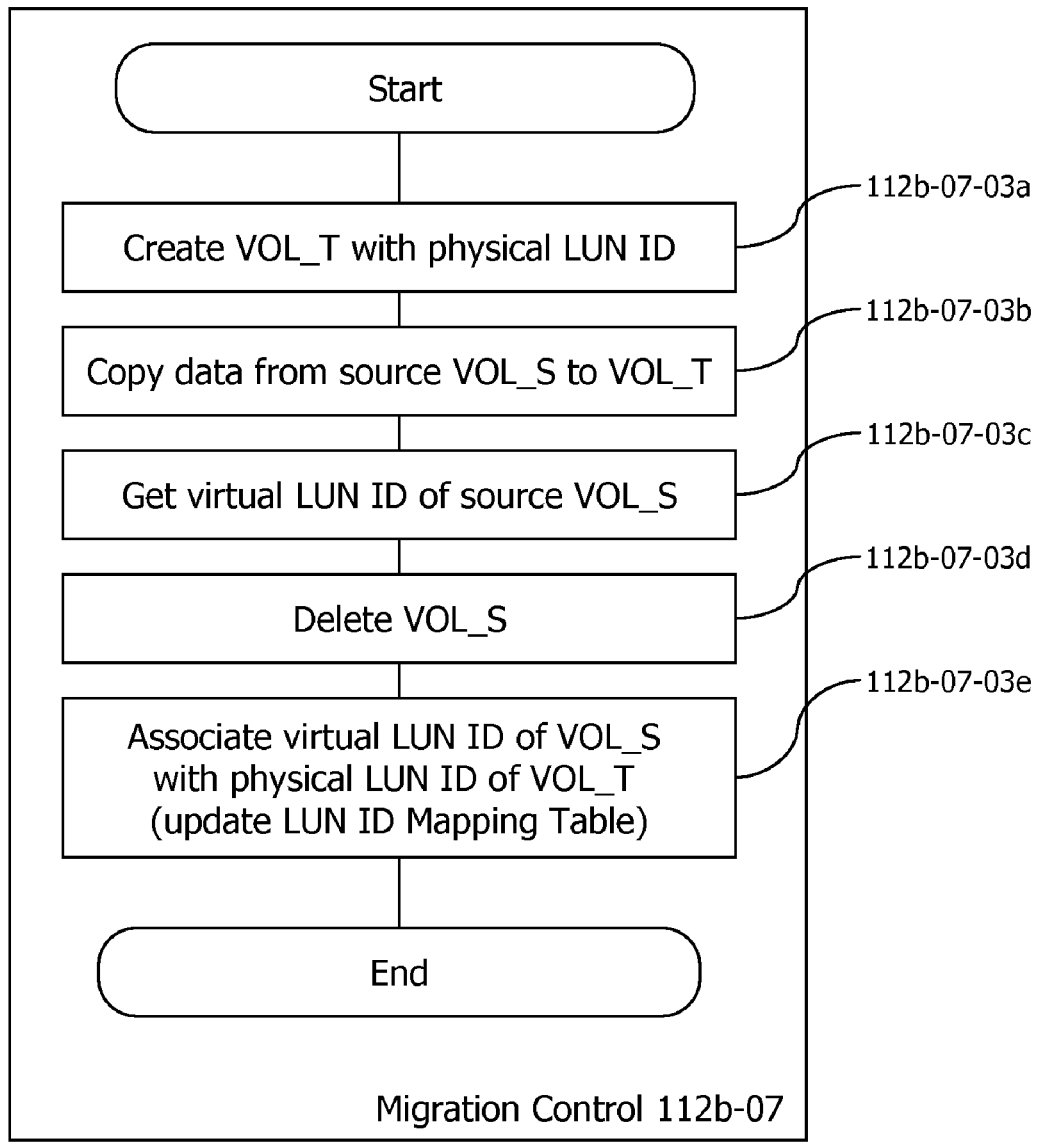
Fig.16 Flowchart of VOL migration with LUN ID (using virtual LUN ID)

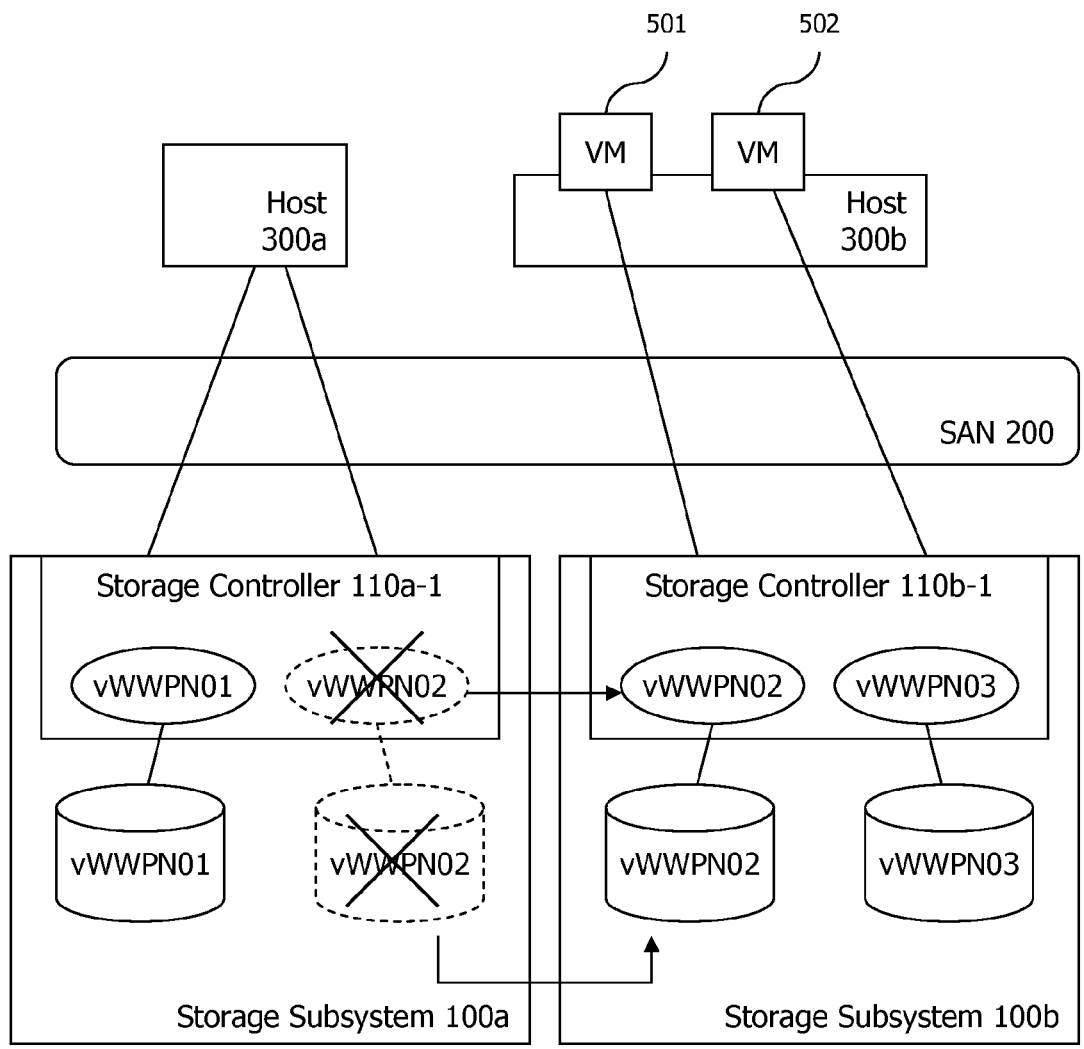
Fig.17 System Configuration (logical view)

| LUN | VOL # | LUN ID |
|---|---|---|
| 0 | 0 | vWWPN01 |
| ~~1~~ | ~~1~~ | ~~vWWPN02~~ |

Logical Volume Management Table 112a-04

Fig.18a Example of Logical Volume Management Table

| LUN | VOL # | LUN ID |
|---|---|---|
| 0 | 0 | vWWPN02 |
| 1 | 1 | vWWPN03 |

Logical Volume Management Table 112b-04

Fig.18b Example of Logical Volume Management Table

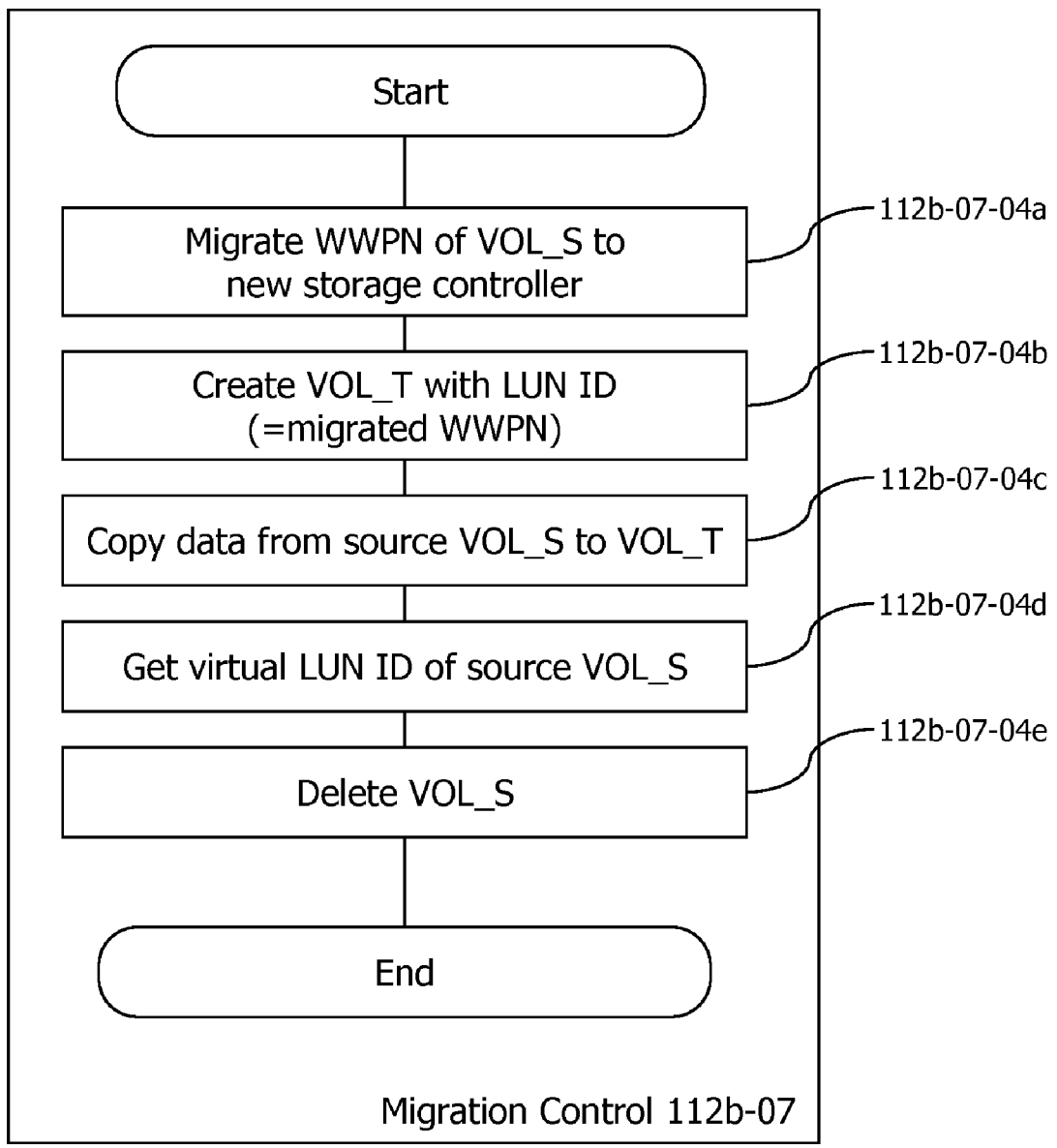
Fig.19 Flowchart of VOL migration with WWPN

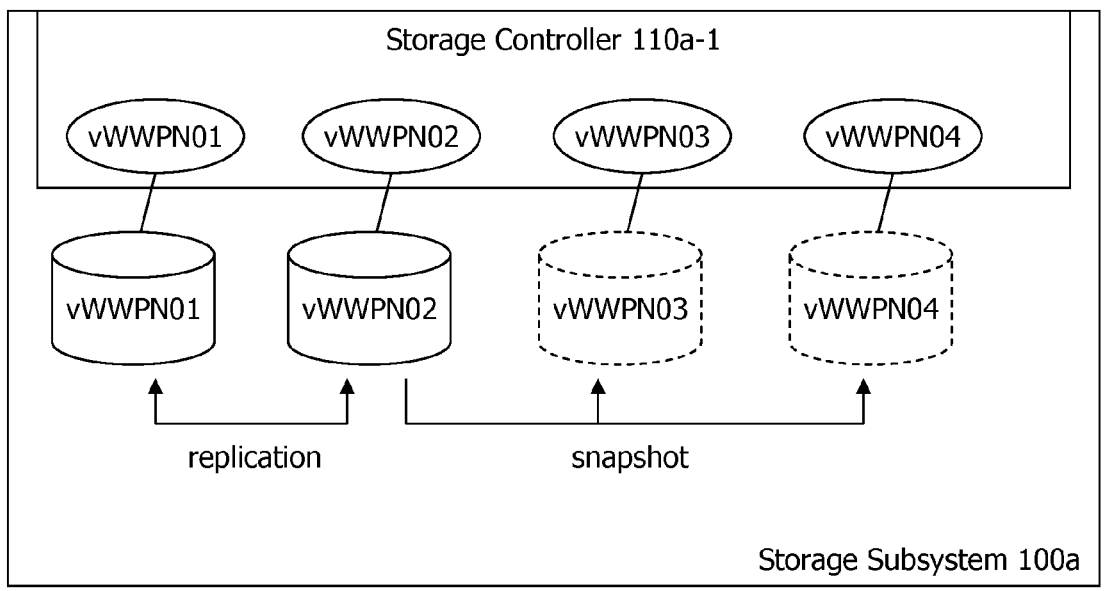
Fig.20 System Configuration (replication, snapshot)

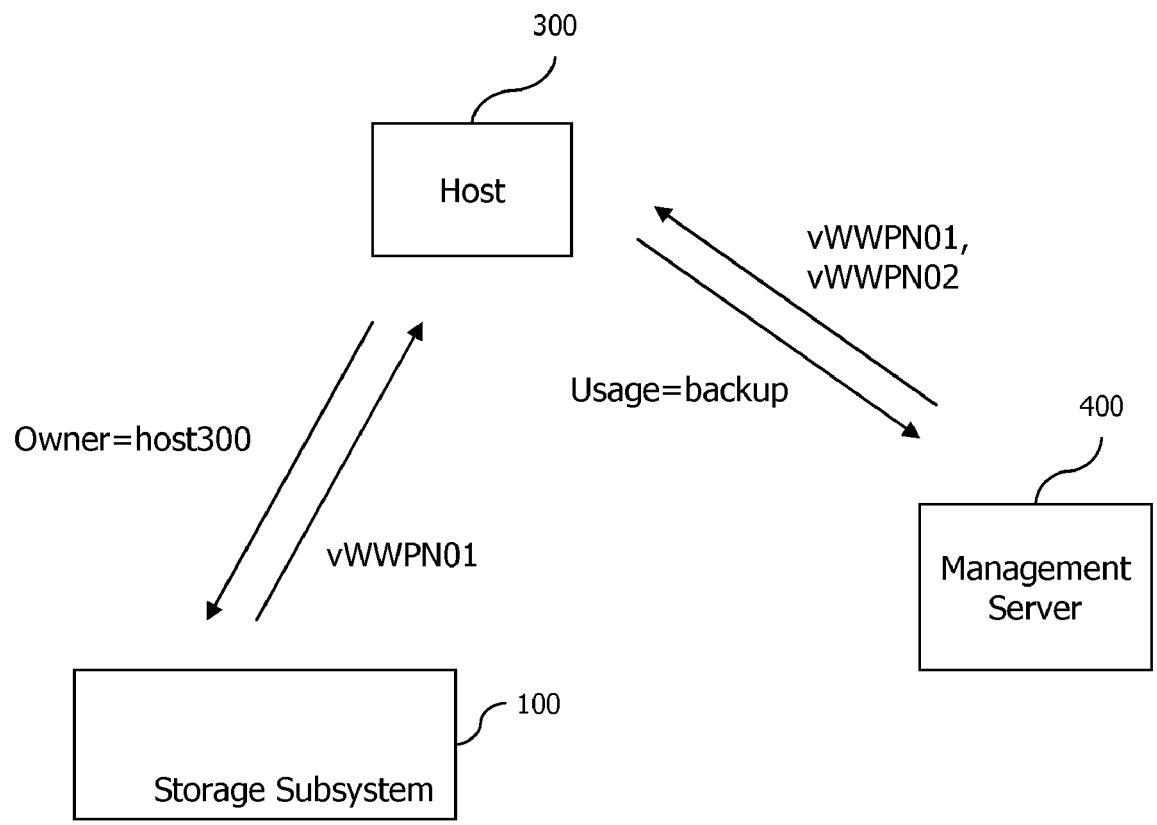
Fig.21 Example of Searching LUN using query

| Metadata | | | | LUN ID (vWWPN) |
|---|---|---|---|---|
| Date | Owner (host) | Owner (storage) | Usage | |
| 1/10 1:11 | Host 300 | Storage Subsystem 100a | backup | vWWPN01 |
| 1/11 1:12 | VM 501 | Storage Subsystem 100b | backup | vWWPN02 |
| 1/11 1:30 | VM 502 | Storage Subsystem 100b | online | vWWPN03 |

LUN ID Metadata Table 112b-10

Fig.22 Example of LUN ID Mapping Table

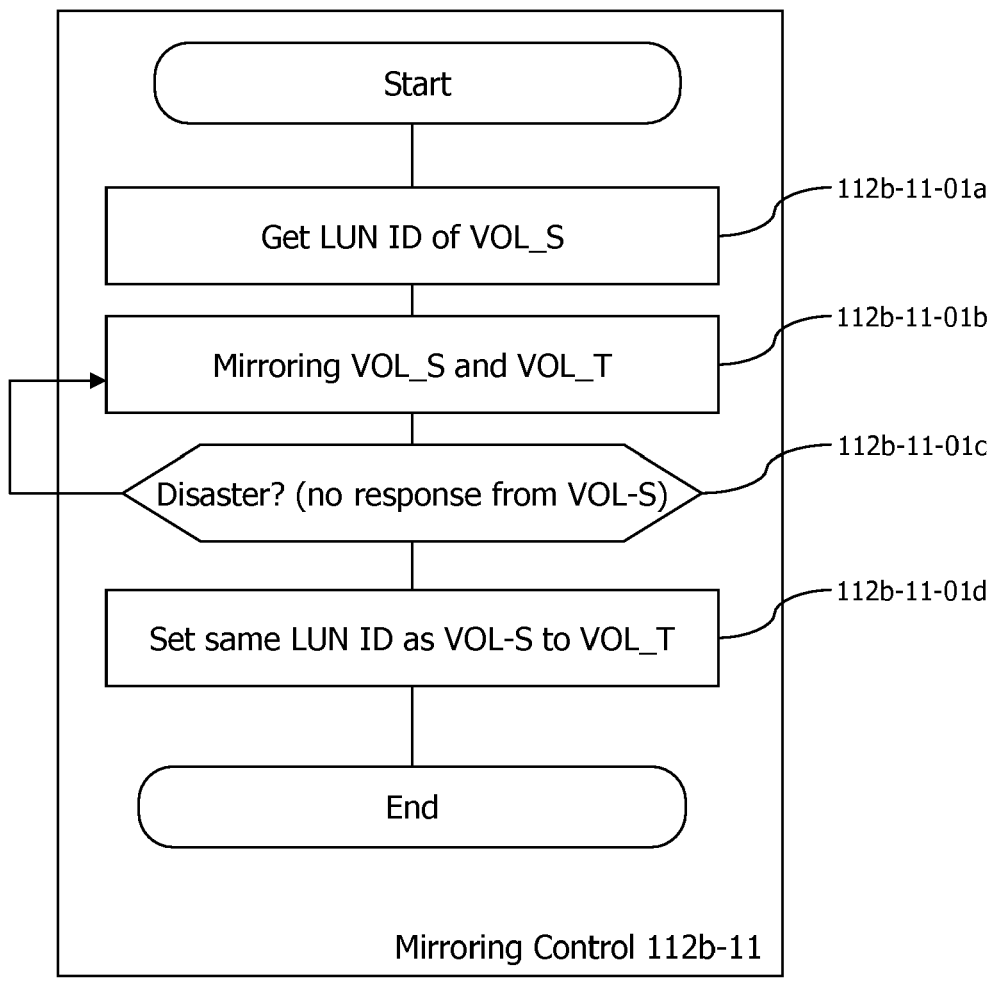
Fig.23 Flowchart of Failover (when using Mirroring)

METHOD AND APPARATUS FOR LOGICAL
VOLUME MANAGEMENT

FIELD OF THE INVENTION

This invention relates in general to storage technology and more specifically to methods and systems related to the logical volume management of a storage subsystem, and especially SAN (Storage Area Network).

DESCRIPTION OF THE RELATED ART

The storage subsystem in SAN has one or more logical volumes, called the LU (Logical Unit). The host in SAN connects to a storage subsystem and accesses the LU in order to read/write data. Each LU has its own identification data to identify itself. For instance, the host typically requires ID information from the LU to connect with it properly. There are two typical IDs for the LU.

WWPN and LUN

Each physical port of storage subsystem has its own WWPN (World Wide Port Name). The WWPN is used for identification for the physical port and every LU can be accessed via the physical port using WWPN. Each physical port has one or more LUs and each LU has a number to identify itself. This identifier is called the LUN (Logical Unit Number).

However, when the physical port (WWPN) is changed (for example, because of storage subsystem migration and so on), the new WWPN and LUN combination will also be changed. It will therefore not work as a valid identification for the LU because it is not same identification data anymore.

LUN ID

Each LU has its own identifier based on the storage controller WWN (World Wide Name). When the LU is created, the storage controller (which creates this LU) gives the LU an identifier. The identifier is made by the combination WWN of the storage controller and the timestamp of the LU's creation.

However, the LU migration requires a storage administrator to create a new LU. The LUN ID of this new LU will be different from the old LU. In this case, the LUN ID will be changed despite the LUs having same data (the old LU will be deleted after migration process). LU mirroring also requires the storage administrator to create a new LU. This results in the same problem that occurs with migration (same data, different LUN ID).

In order to manage logical volumes more easily, it is therefore very important to maintain consistency between the data and the LU identification. When the same data is migrated from LU_1 to LU_2, the current solution does not offer the same LU identification despite LU_2 having the same data as LU_1.

Therefore, there is a need for systems and methods that maintain consistent logical volume management of the storage subsystem in the SAN.

SUMMARY OF THE INVENTION

The inventive methodology is directed to methods and systems that substantially obviate one or more of the above and other problems associated with consistency between data and the LU identification.

Aspects of the present invention include a system which includes a storage subsystem comprising a storage controller and a plurality of logical units; a storage area network; a host computer connected to the storage area network; a management server connected to the storage subsystem, the storage area network and the host computer; wherein the storage subsystem creates a virtual World Wide Port Name (WWPN) for each of the plurality of logical units, and wherein a Logical Unit Number Identifier (LUN ID) is generated for each of the plurality of logical units based on the virtual WWPN.

Aspects of the present invention further include a system, including a storage subsystem comprising a storage controller and a plurality of logical units; a storage area network; a host computer connected to the storage area network; a management server connected to the storage subsystem, the storage area network and the host computer; wherein the storage controller further comprises instructions for migrating a source logical unit with a physical logical unit number ID (LUN ID), the instructions executing a process including creating a target logical unit; migrating the source logical unit into the target logical unit; maintaining the target logical unit as a mirror of the source logical unit; and wherein if the source logical unit fails, migrating the physical LUN ID of the source logical unit to the target logical unit.

Aspects of the present invention further include a system, including a storage subsystem comprising a storage controller and a plurality of logical units; a storage area network; a host computer connected to the storage area network; a management server connected to the storage subsystem, the storage area network and the host computer; wherein the storage controller further comprises instructions for migrating a source logical unit with a physical logical unit number ID (LUN ID) and a virtual LUN ID, the instructions executing a process including creating a target logical unit; creating a physical LUN ID for the target logical unit; and migrating the source logical unit and the virtual LUN ID of the source logical unit into the target logical unit.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 illustrates an exemplary system configuration of the present invention.

FIG. 2 illustrates functions executed by application programs.

FIG. 3 illustrates an exemplary configuration of the Host Computer.

FIG. 4 illustrates an exemplary configuration of the Management Server.

FIG. 5 illustrates an exemplary embodiment of a system configuration.

FIG. 6 illustrates an exemplary embodiment of the logical volume management table.

FIG. 7 illustrates the migration process with LUN ID.

FIG. 8*a* and FIG. 8*b* illustrates an exemplary embodiment of the logical volume management table after the migration process.

FIG. 9 illustrates another exemplary embodiment of a system configuration.

FIG. 10 illustrates an exemplary embodiment of the LUN ID mapping table.

FIG. 11 illustrates a an exemplary embodiment of the migration process with LUN ID and how the LUN ID mapping table is updated.

FIG. 12 illustrates the response method to a SCSI inquiry command for LU.

FIG. 13 illustrates another example of a possible system configuration.

FIG. 14a and 14b illustrates an exemplary embodiment of a LUN ID mapping table.

FIG. 15 illustrates how the storage subsystem generates a virtual LUN ID and a physical LUN ID for each LU.

FIG. 16 illustrates an exemplary embodiment of the migration process when using virtual LUN ID.

FIG. 17 illustrates another exemplary embodiment of a system configuration.

FIG. 18a and 18b illustrates an exemplary embodiment of logical volume management table using WWPN as LUN ID.

FIG. 19 illustrates an exemplary embodiment of the migration process using virtual WWPN.

FIG. 20 illustrates an exemplary system configuration along with the replication volume and snapshot volume to be adopted.

FIG. 21 illustrates an exemplary embodiment of searching for an LU using query.

FIG. 22 illustrates an exemplary embodiment of the LUN ID mapping table.

FIG. 23 illustrates the LUN ID migration process when using mirroring and replication.

DETAILED DESCRIPTION

Figure 24:
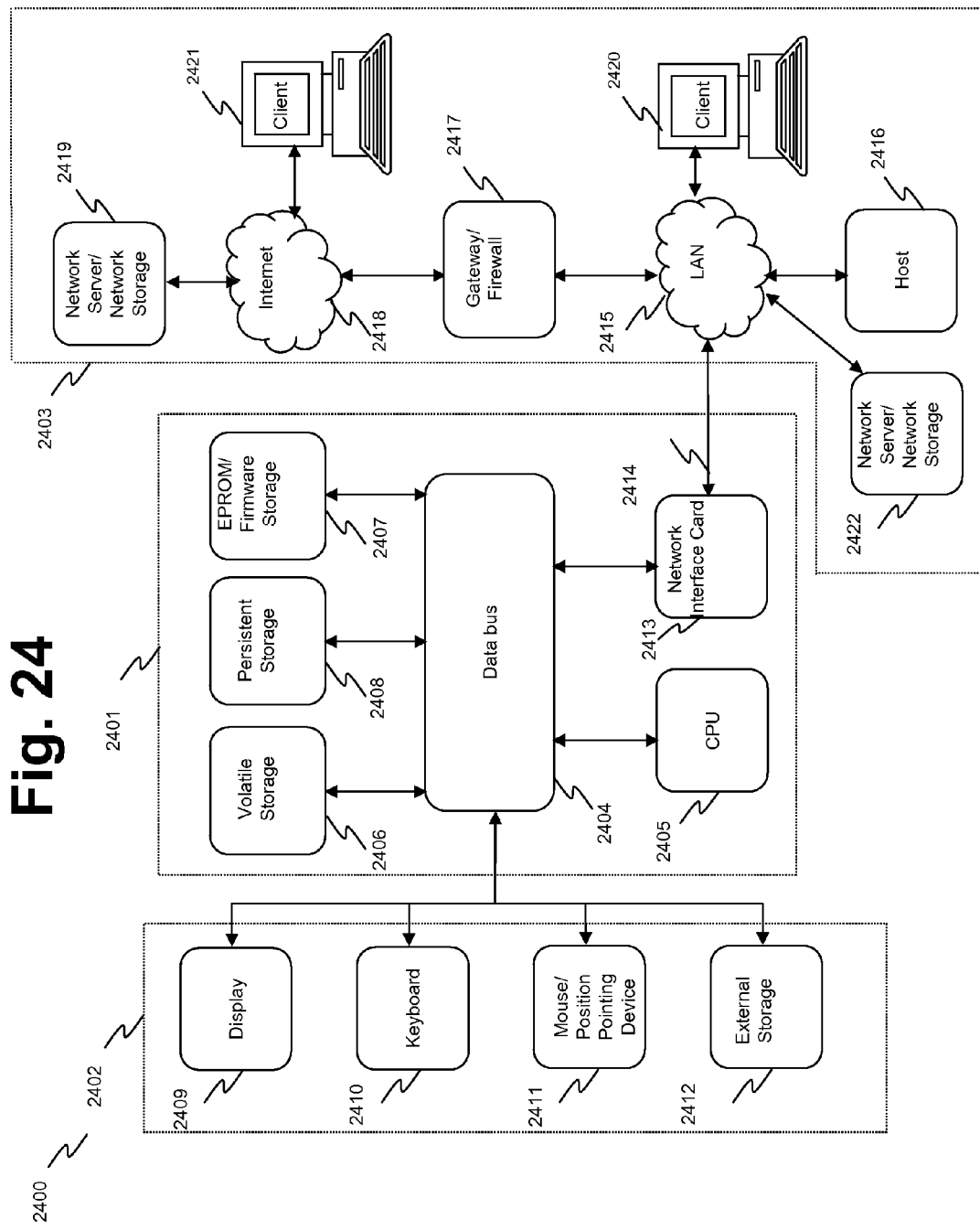
FIG. 24 illustrates an exemplary embodiment of a computer platform upon which the inventive system may be implemented.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software process running on a general purpose computer, in the form of a specialized hardware, or combination of software and hardware.

In one embodiment, the inventive system comprises at least a storage subsystem, host computer and SAN (Storage Area Network). LU_1 (Logical Unit) of the storage subsystem has its own physical LUN ID. When LU_1 (a source logical unit) is migrated into LU_2 (a target logical unit), the storage subsystem creates LU_2 and sets LUN ID of LU_1 after copying data from LU_1 to LU_2 and deleting LU_1. LU_2 can be managed by the same storage subsystem as LU_1's one and/or another storage subsystem.

In another embodiment, the disclosed system comprises at least a storage subsystem, host computer and SAN (Storage Area Network). LU_1 (Logical Unit) of storage subsystem has its own physical LUN ID. When LU_1 (a source logical unit) is migrated into LU_2 (a target logical unit), the storage subsystem creates LU_2 and also creates its own LUN ID. The storage subsystem then associates the LUN ID of LU_1 and LUN ID of LU_2 after migration process. When storage subsystem receives SCSI inquiry command for LU_2, it sends the LUN ID of LU_1 instead of original LUN ID of LU_2. LU_2 can be managed by same storage subsystem as LU_1's one and/or another storage subsystem.

In another embodiment, the inventive system comprises at least storage subsystem, host computer and SAN (Storage Area Network). When storage subsystem creates LU (Logical Unit), it creates physical LUN ID and virtual LUN ID. When LU_1 (a source logical unit) is migrated into LU_2 (a target logical unit), the storage subsystem creates LU_2 with physical LUN ID and set virtual LUN ID of LU_1 after copying data from LU_1 to LU_2 and deleting LU_1. When storage subsystem receives SCSI inquiry command for LU_2, it sends LUN ID of LU_1 instead of original LUN ID of LU_2. LU_2 can be managed by same storage subsystem as LU_1's one and/or another storage subsystem.

In another embodiment, the inventive system comprises at least a storage subsystem, host computer and SAN (Storage Area Network). When the storage subsystem creates LU (Logical Unit), it creates virtual WWPN for the access port of this LU and LUN ID using its virtual WWPN. When LU_1 (a source logical unit) is migrated into LU_2 (a target logical unit), storage subsystem migrates and associates virtual WWPN of LU_1 with LU_2, and then creates LUN ID using migrated virtual WWPN. LU_2 can be managed by same storage subsystem as LU_1's one and/or another storage subsystem.

In another embodiment, the inventive system comprises at least a storage subsystem, host computer and SAN (Storage Area Network). The storage subsystem has a mapping table between LUN ID and the metadata of LU. When host computer sends a search query, storage subsystem responses proper LUN ID by matching the search query with metadata. The management server can also execute this process.

In another embodiment, the disclosed system comprises at least a storage subsystem, host computer and SAN (Storage Area Network). LU_1 and LU_2 are mirrored (replicated) to each other, and when LU_1 is destroyed by disaster or due to other causes, the storage subsystem sets the LUN ID of LU_1 to LU_2.

System Structure

FIG. 1 shows system configuration of an embodiment of the invention. It includes a Storage Subsystem 100, a SAN-SW 200, a Host Computer 300 and a Management Server 400.

The Storage Subsystem 100 has a Storage Controller 110 and a Disk Unit 120. The Storage Controller can include a SAN I/F 113, a CPU 111, Memory 112 and an Ethernet I/F 115. The Storage Controller performs disk I/O functions with the Host Computer 300 by using a Fibre Channel Protocol via the SAN 200. The Disk Unit 120 has a plurality of Hard Disk Drives (HDD) 121 and the Storage Controller combines these HDDs and configures RAID (Redundant Arrays of Inexpensive Disks), and then provides Volume (LU: Logical Unit) to the Host Computer 300. These functions are executed by application programs as shown by FIG. 2 (Logical Volume I/O Control, Physical Disk Control and so on).

FIG. 2 illustrates an example software module configuration on the storage controller. This can include Logical Volume I/O Control 112-01, Physical Disk Control 112-02, Flush Cache Control 112-03, a Logical Volume Management Table 112-04, a RAID Management Table 112-05, Configuration Control 112-06, Migration Control 112-07, LUN ID Mapping Table 112-08, LUN ID Metadata Control 112-09, LUN ID Metadata Table 112-10, and Mirroring Control 112-11.

FIG. 3 shows the configuration of the Host Computer 300. The Host Computer 300 connects to the SAN 200. The Host Computer 300 also contains a Hypervisor program for the Virtual Machine which enables the physical Host Computer 300 to run multiple virtual server machine images (VM). Each VM has I/O connections to the Storage Subsystem 100. The Host Computer itself can include an Ethernet I/F 304, CPU 301, and a Host Bust Adapter (HBA) 303. The Memory 302 of the Host Computer can include an Operating System 302-01, the aforementioned Hypervisor Program for the Virtual Machine 302-02, I/0 Control 302-03, and a Storage Path Management Table 302-04.

FIG. 4 shows the configuration of the Management Server 400. It connects to the Storage Subsystem 100, the SAN 200 and the Host Computer 300 via LAN to control them. The Management Server itself may include an Ethernet I/F 403 and CPU 401. The Memory 402 of the Management Server can include an Operating System 402-01, a LUN ID Proxy 402-02, a LUN ID Mapping Table 402-03, LUN ID Metadata Control 402-04, and a LUN ID Metadata Table 402-05.

Migration with LUN ID

Using migration with LUN ID allows the administrator to maintain consistency between the data and the LU identifier. LU_1 (Logical Unit) of the storage subsystem has its own physical LUN ID. When LU_1 is migrated into LU_2, the storage subsystem creates LU_2 and sets LUN ID of LU_1 after copying data from LU_1 to LU_2 and deleting LU_1. LU_2 can thus be managed by the same storage subsystem as LU_1's one and/or another storage subsystem.

FIG. 5 shows an example system configuration. The Host and/or the Virtual Machine (VM) 501, 502 connect to the storage subsystem 100, access to the logical volume (shown as "110a-a:01", for instance). "110a-a:01" is by LUN ID generated by the storage controller 110a-1 using its WWN (World Wide Name) and timestamp, for example. FIG. 6 shows the example of logical volume management table 112a-04. It manages the mapping between LUN and VOL # and LUN ID. This time, the data of logical volume "110a-2:02" will be migrated to "110b-01:01".

FIG. 7 shows the migration process with LUN ID. This process is executed by migration control 112b-07 on the storage subsystem 100b, for instance. VOL_S represents the source LU for migration, VOL_T represents the target LU for migration. First, it creates LU "110b-1:01" 112b-07-01a, the target LU of migration. Next, it copies the data 112b-07-01b of "110a-2:02" to "110b-1:01" and deletes 112b-07-01d LU "110a-2:02" after the copying process. Then it rewrites 112b-07-01e LUN ID of "110b-1:01" to "110a-2:02", the LUN ID of VOL_S acquired previously 112b-07-01c. FIG. 8a and 8b shows the example of logical volume management table 112a-04 112b-04 after this migration process.

Furthermore, this example illustrates the inter storage subsystem environment. The Old LU and the new LU can be placed on the same storage subsystem as well.

LUN ID Proxy

Using the migration with the LUN ID and the LUN ID proxy allows the administrator to maintain consistency between the data and the LU identifier. LU_1 (Logical Unit) of the storage subsystem has its own physical LUN ID. When LU_1 is migrated into LU_2, the storage subsystem creates LU_2 and also creates its own LUN ID. The storage subsystem associates the LUN ID of LU_1 and the LUN ID of LU_2 after the migration process. When the storage subsystem receives a SCSI inquiry command for LU_2, it sends the LUN ID of LU_1 instead of the original LUN ID of LU_2.

FIG. 9 shows the example of system configuration. "10a-a:01" is a LUN ID generated by storage controller 110a-1 using its WWN (World Wide Name) and timestamp, for instance. This time, the data of logical volume "110a-2:02" will be migrated to "110b-01:01". Subsequently, LUN ID "110a-2:02" will be migrated to the storage subsystem and associated with the LUN ID "110b-01:01". This association can be managed by the LUN ID mapping table 112b-08 (shown in FIG. 10).

FIG. 11 shows the migration process with LUN ID and how the LUN ID mapping table is updated. This process is executed by migration control 112b-07 on the storage subsystem 100b, for instance. At first, it creates 112b-07-02a LU "110b-1:01", the target LU for migration. Next, it copies the data of "110a-2:02" to "10b-1:01" 112b-07-02b, acquires the LUN ID of the source LU 112b-07-02c and deletes 112b-07-02d LU "110a-2:02" after the copying process completes. Then, it adds new mapping information between 112b-07-02e LUN ID "110b-1:01" and "110a-2:02".

FIG. 12 shows the response method to a SCSI inquiry command for LU from the Logical Volume I/O Control 112b-01. The host issues a SCSI inquiry command 112b-01-01a to obtain the condition of the LU, including the LUN ID. The conventional method is for the storage subsystem to respond 112b-01-01e with the physical LUN ID 112b-01-01d. For instance, a SCSI inquiry command for LU "110b-1:01" means that the storage subsystem sends a response with LUN ID "110b-1:01". However this invention refers to the LUN ID mapping table 112b-01-01b instead and thus sends LUN ID "110a-2:02" 112b-01-01c instead of "110b-1:01".

FIG. 13 shows another example of a system configuration. Each LU has its own physical LUN ID and virtual LUN ID as well. When migration occurs, the virtual LUN ID will be migrated with the actual data, and the storage subsystem sends the virtual LUN ID in response to a SCSI inquiry. FIG. 14a and 14b shows the example of LUN ID mapping table 112a-08, 112b-08. When a new LU is created 112b-06-02a (including replication and/or snapshot), the storage subsystem generates a virtual LUN ID 112b-06-02b and a physical LUN ID for each LU (shown as FIG. 15 in the configuration control 112b-06) 112b-06-02c.

FIG. 16 shows the migration process when using virtual LUN ID, as done by the migration control 112b-07. First a target volume is created with a physical LUN ID 112b-07-03a. Then data is copied from the source volume to the target volume 112b-07-03b. The virtual LUN ID of the source volume is acquired 112b-07-03c. Then the source volume is deleted 112b-07-03d, and the LUN ID mapping table is updated 112b-07-03e.

This example also shows an example of the inter storage subsystem environment. The old LU and the new LU can be placed on same storage subsystem as well.

Virtual WWPN as LUN ID

This invention allows the storage subsystem to use a virtual WWPN (World Wide Port Name) as a LUN ID. At first, a NPIV (N_Port ID Virtualization) is adopted into the storage subsystem; which allows the storage subsystem to have a virtual WWPN. When the storage subsystem creates a LU (Logical Unit), it creates a virtual WWPN for an access port of this LU. The LUN ID will be generated by using its virtual WWPN (or same as virtual WWPN). When LU_1 is migrated into LU_2, the storage subsystem migrates and associates virtual WWPN of LU_1 with LU_2, and then creates a LUN ID using the migrated virtual WWPN.

FIG. 17 shows the example of system configuration. "vWWPN01" is LUN ID generated by storage controller 110a-1. It is also a virtual WWPN for LU access. One LU has one or more virtual WWPNs for access port and LUN ID (if it has two WWPN, it can be used for multiple path). When migration of the logical volume "vWWPN02" occurs, not only is the data of "vWWPN02" migrated, but also the virtual WWPN for access port are migrated as well. FIG. 18a and 18b shows an example of the logical volume management table 112a-04, 112b-04 using WWPN as LUN ID.

FIG. 19 shows the migration process using virtual WWPN. This process is executed by migration control 112b-07 on storage subsystem 100b, for instance. First, it migrates 112b-07-04a the virtual WWPN to a new storage controller and creates a new LU 112b-07-04b for migration. This virtual WWPN migration lets the new storage controller create a new LUN ID 112b-07-04d based on the migrated virtual WWPN (same LUN ID will be generated). After that, the processes of copying data 112b-07-04c and of deleting LU 112b-07-04e will be executed.

In this invention, the virtual WWPN will be created when the new volume is created (This mean that each volume has its own virtual WWPN for access and identification). Shown as FIG. 20, the replication volume and snapshot volume will be adopted as well. When the new replication/snapshot volume is created, the virtual WWPN for it will be created as well.

This also shows an example of the inter storage subsystem environment. The Old LU and new LU can be placed on same storage subsystem as well.

This invention allows the administrator to search and know the proper LU and access path (virtual WWPN). For instance, the administrator send a search query like "Owner=host300", and then the storage subsystem or the management server tells the administrator the virtual WWPN to access the proper LU. FIG. 21 shows the example of searching LU using query.

FIG. 22 shows an example of the LUN ID mapping table 112b-10. The administrator can input metadata for each LU. The administrator can the search LU by using search words such as "host 300", "backup" and so on.

LU Mirroring, Replication

When LU_1 and LU_2 are mirrored (replicated), they have the same data as each other. If LU_1 is destroyed by accident or what not, the host would want to use LU_2 instead of LU_1. At this time, having a consistent LUN ID could prevent the host from changing their operation, script and so on.

FIG. 23 shows the LUN ID migration process when using mirroring and replication 112b-11. This process is executed by migration control 112b-07 on storage subsystem 100b, for instance. If it detects the failure of LU_1, the LUN ID migration of LU_1 to LU_2 will occur. First the LUN ID of the source volume is acquired 112b-11-01a. Then the source volume and the target volume are maintained as mirrors 112b-11-01b. If a disaster occurs such that the source volume no longer responds 112b-11-01c, then the target volume will have the LUN ID of the source volume 112b-11-01d.

Exemplary Computer Platform

FIG. 24 is a block diagram that illustrates an embodiment of a computer/server system 2400 upon which an embodiment of the inventive methodology may be implemented. The system 2400 includes a computer/server platform 2401, peripheral devices 2402 and network resources 2403.

The computer platform 2401 may include a data bus 2404 or other communication mechanism for communicating information across and among various parts of the computer platform 2401, and a processor 2405 coupled with bus 2401 for processing information and performing other computational and control tasks. Computer platform 2401 also includes a volatile storage 2406, such as a random access memory (RAM) or other dynamic storage device, coupled to bus 2404 for storing various information as well as instructions to be executed by processor 2405. The volatile storage 2406 also may be used for storing temporary variables or other intermediate information during execution of instructions by processor 2405. Computer platform 2401 may further include a read only memory (ROM or EPROM) 2407 or other static storage device coupled to bus 2404 for storing static information and instructions for processor 2405, such as basic input-output system (BIOS), as well as various system configuration parameters. A persistent storage device 2408, such as a magnetic disk, optical disk, or solid-state flash memory device is provided and coupled to bus 2401 for storing information and instructions.

Computer platform 2401 may be coupled via bus 2404 to a display 2409, such as a cathode ray tube (CRT), plasma display, or a liquid crystal display (LCD), for displaying information to a system administrator or user of the computer platform 2401. An input device 2410, including alphanumeric and other keys, is coupled to bus 2401 for communicating information and command selections to processor 2405. Another type of user input device is cursor control device 2411, such as a mouse, a trackball, or cursor direction keys for communicating direction information and command selections to processor 2404 and for controlling cursor movement on display 2409. This input device typically has two degrees of freedom in two axes, a first axis (e.g., x) and a second axis (e.g., y), that allows the device to specify positions in a plane.

An external storage device 2412 may be coupled to the computer platform 2401 via bus 2404 to provide an extra or removable storage capacity for the computer platform 2401. In an embodiment of the computer system 2400, the external removable storage device 2412 may be used to facilitate exchange of data with other computer systems.

The invention is related to the use of computer system 2400 for implementing the techniques described herein. In an embodiment, the inventive system may reside on a machine such as computer platform 2401. According to one embodiment of the invention, the techniques described herein are performed by computer system 2400 in response to processor 2405 executing one or more sequences of one or more instructions contained in the volatile memory 2406. Such instructions may be read into volatile memory 2406 from another computer-readable medium, such as persistent storage device 2408. Execution of the sequences of instructions contained in the volatile memory 2406 causes processor 2405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2405 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 2408. Volatile media includes dynamic memory, such as volatile storage 2406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 2405 for execution. For example, the instructions may initially be carried on a magnetic disk from a remote computer. Alternatively, a remote computer can load the instructions into its dynamic memory and send the instructions over a telephone line using a modem. A modem local to computer system 2400 can receive the data on the telephone line and use an infra-red transmitter to convert the data to an infra-red signal. An infra-red detector can receive the data carried in the infra-red signal and appropriate circuitry can place the data on the data bus 2404. The bus 2404 carries the data to the volatile storage 2406, from which processor 2405 retrieves and executes the instructions. The instructions received by the volatile memory 2406 may optionally be stored on persistent storage device 2408 either before or after execution by processor 2405. The instructions may also be downloaded into the computer platform 2401 via Internet using a variety of network data communication protocols well known in the art.

The computer platform 2401 also includes a communication interface, such as network interface card 2413 coupled to the data bus 2404. Communication interface 2413 provides a two-way data communication coupling to a network link 2414 that is coupled to a local network 2415. For example, communication interface 2413 may be an integrated services digital network (ISDN) card or a modem to provide a data communication connection to a corresponding type of telephone line. As another example, communication interface 2413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2413 sends and receives electrical, electromagnetic or optical signals that carry digital data streams representing various types of information.

Network link 2413 typically provides data communication through one or more networks to other network resources. For example, network link 2414 may provide a connection through local network 2415 to a host computer 2416, or a network storage/server 2417. Additionally or alternatively, the network link 2413 may connect through gateway/firewall 2417 to the wide-area or global network 2418, such as an Internet. Thus, the computer platform 2401 can access network resources located anywhere on the Internet 2418, such as a remote network storage/server 2419. On the other hand, the computer platform 2401 may also be accessed by clients located anywhere on the local area network 2415 and/or the Internet 2418. The network clients 2420 and 2421 may themselves be implemented based on the computer platform similar to the platform 2401.

Local network 2415 and the Internet 2418 both use electrical, electromagnetic or optical signals that carry digital data streams. The signals through the various networks and the signals on network link 2414 and through communication interface 2413, which carry the digital data to and from computer platform 2401, are exemplary forms of carrier waves transporting the information.

Computer platform 2401 can send messages and receive data, including program code, through the variety of network(s) including Internet 2418 and LAN 2415, network link 2414 and communication interface 2413. In the Internet example, when the system 2401 acts as a network server, it might transmit a requested code or data for an application program running on client(s) 2420 and/or 2421 through Internet 2418, gateway/firewall 2417, local area network 2415 and communication interface 2413. Similarly, it may receive code from other network resources.

The received code may be executed by processor 2405 as it is received, and/or stored in persistent or volatile storage devices 2408 and 2406, respectively, or other non-volatile storage for later execution. In this manner, computer system 2401 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized systems for logical volume management. It is intended that the specification and examples be considered as exemplary only, with a true scope and spirit of the invention being indicated by the following claims.

What is claimed is:

1. A system, comprising:
  a storage subsystem comprising a storage controller and a plurality of logical units;
  a storage area network;
  a host computer connected to the storage area network;
  a management server connected to the storage subsystem, the storage area network and the host computer;
  wherein the storage subsystem creates a virtual World Wide Port Name (WWPN) for each of the plurality of logical units, and wherein a Logical Unit Number Identifier (LUN ID) is generated for each of the plurality of logical units based on the virtual WWPN,
  wherein the storage controller further comprises instructions for migrating a source logical unit with a virtual WWPN, the instructions executing a process comprising:
  migrating the virtual WWPN of the source logical unit to a new storage controller;
  creating a target logical unit;
  creating a LUN ID for the target logical unit based on the migrated virtual WWPN;

copying the source logical unit to the target logical unit; and deleting the source logical unit,
wherein the LUN ID is generated by the storage controller through the use of a world wide name (WWN) of the source logical unit and additional information generated along with creation of the source logical unit
wherein the additional information generated along with creation of the source logical unit is a timestamp.

2. The system of claim 1, further comprising a logical volume management table utilizing the virtual WWPN as the LUN ID and mapping logical units to the corresponding LUN IDs.

3. The system of claim 1, wherein each of the plurality of logical units utilizes its virtual WWPN as an access port.

4. The system of claim 1, wherein the migrating the virtual WWPN of the source logical unit is done by a migration control module in the storage controller.

5. The system of claim 1, wherein upon receiving a search query from an administrator, the storage subsystem or the management server returns the virtual WWPN corresponding to the proper logical unit.

6. A system, comprising:
a storage subsystem comprising a storage controller and a plurality of logical units;
a storage area network;
a host computer connected to the storage area network;
a management server connected to the storage subsystem, the storage area network and the host computer;
wherein the storage controller further comprises instructions for migrating a source logical unit with a physical logical unit number ID (LUN ID), the instructions executing a process comprising:
creating a target logical unit;
migrating the source logical unit into the target logical unit;
maintaining the target logical unit as a mirror of the source logical unit; and
wherein if the source logical unit fails, migrating the physical LUN ID of the source logical unit to the target logical unit,
wherein the LUN ID is generated by the storage controller through the use of a world wide name (WWN) of the source logical unit and additional information generated along with creation of the source logical unit;
wherein the additional information generated along with creation of the source logical unit is a timestamp.

7. The system of claim 6, wherein the storage controller further comprises a logical volume management table, wherein the logical volume management table maps logical units to corresponding LUN IDs.

8. The system of claim 7, wherein the migrating the source logical unit is done by a migration control module in the storage controller.

9. The system of claim 8, wherein the logical volume management table is updated after the completion of the migrating the source logical unit.

10. The system of claim 6, wherein the instructions for migrating a source logical unit further comprises creating a LUN ID for the target logical unit.

11. A system, comprising:
a storage subsystem comprising a storage controller and a plurality of logical units;
a storage area network;
a host computer connected to the storage area network;
a management server connected to the storage subsystem, the storage area network and the host computer;
wherein the storage controller further comprises instructions for migrating a source logical unit with a physical logical unit number ID (LUN ID) and a virtual LUN ID, the instructions executing a process comprising:
creating a target logical unit;
creating a physical LUN ID for the target logical unit; and
migrating the source logical unit and the virtual LUN ID of the source logical unit into the target logical unit,
wherein the LUN ID is generated by the storage controller through the use of a world wide name (WWN) of the source logical unit and additional information generated along with creation of the source logical unit;
wherein the additional information generated along with creation of the source logical unit is a timestamp.

12. The system of claim 11, wherein the storage controller further comprises a LUN ID mapping table, wherein the LUN ID mapping table maps virtual LUN IDs to physical LUN IDs.

13. The system of claim 12, wherein when a SCSI inquiry command for the target logical unit is received, the storage controller refers to the LUN ID mapping table and returns either the virtual LUN ID or the physical LUN ID of the target logical unit.

14. The system of claim 13, wherein the instructions for migrating a source logical unit further comprises deleting the source logical unit.

15. The system of claim 12, wherein the LUN ID mapping table is updated upon migration of the virtual LUN ID.

16. The system of claim 15, wherein the updating is done by either the storage subsystem or the management control.

17. The system of claim 11, wherein the storage controller generates the physical LUN ID and the virtual LUN ID for each of the logical units within the plurality of logical units.

* * * * *